Aug. 11, 1953  W. O. MARTIN  2,648,408
RAILROAD BRAKE SLACK ADJUSTER
Filed Dec. 30, 1949  2 Sheets-Sheet 1
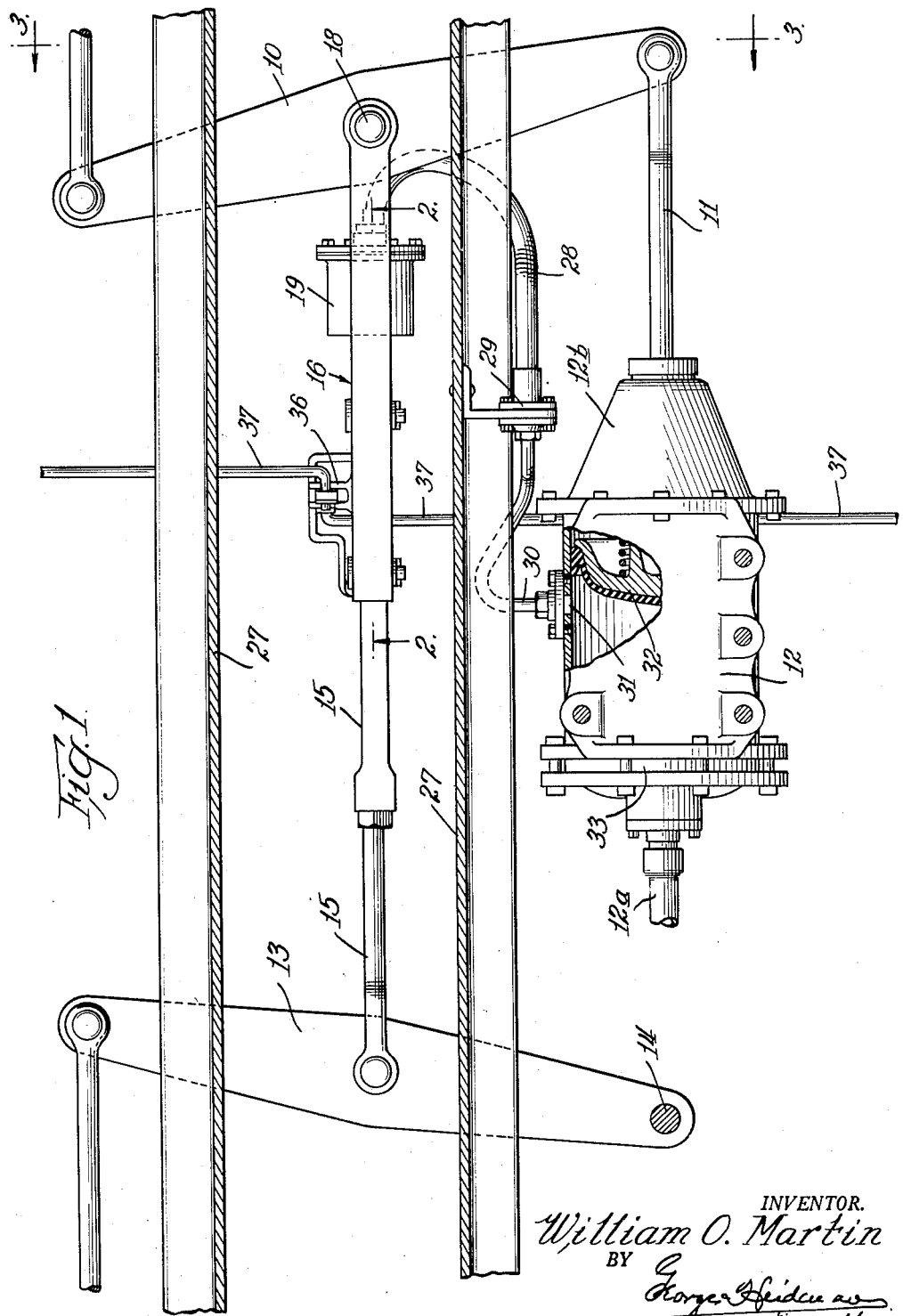
INVENTOR.
William O. Martin
BY
[signature]
Att'y.

Aug. 11, 1953  W. O. MARTIN  2,648,408
RAILROAD BRAKE SLACK ADJUSTER
Filed Dec. 30, 1949  2 Sheets-Sheet 2
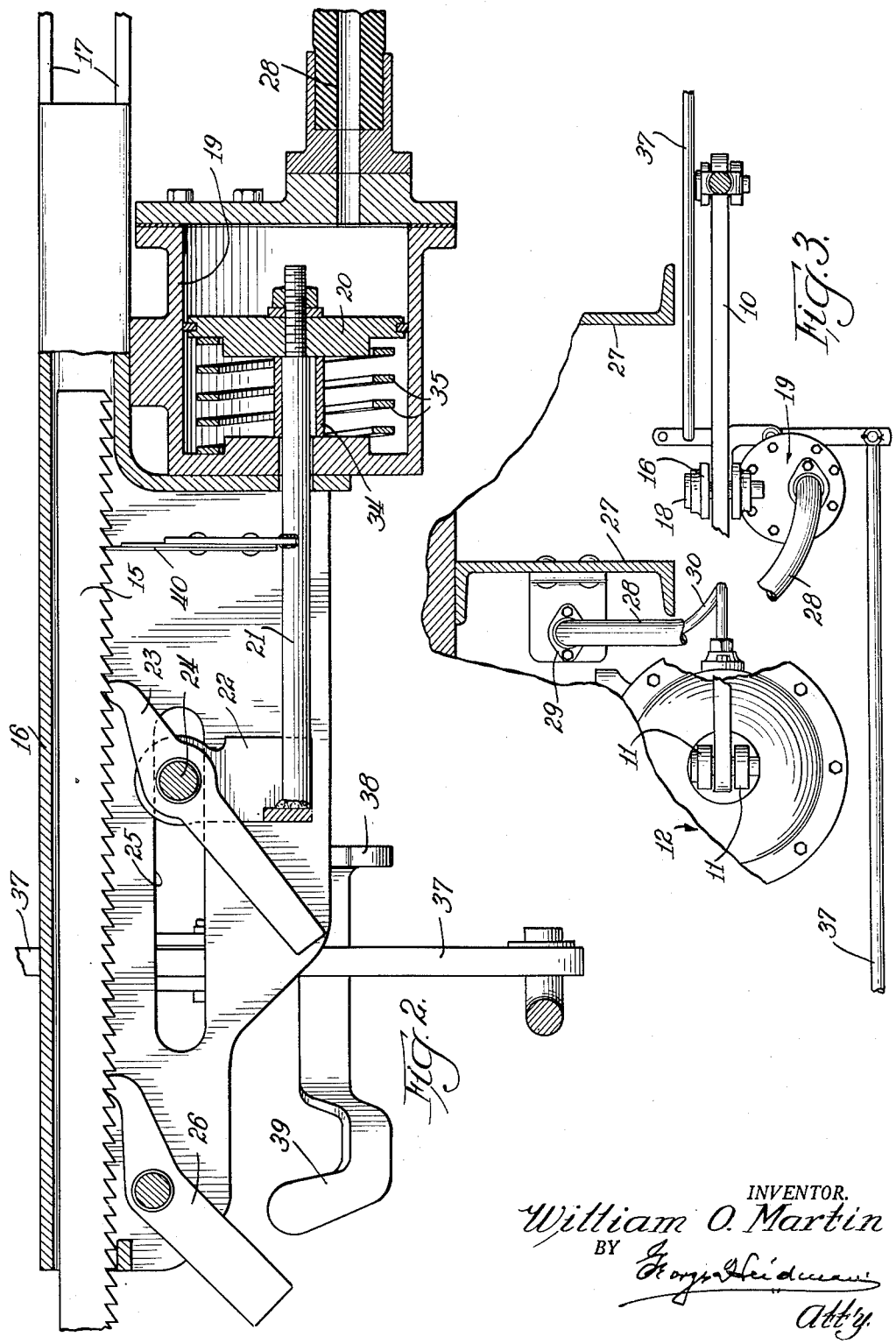
INVENTOR.
William O. Martin
BY
Atty.

Patented Aug. 11, 1953

2,648,408

UNITED STATES PATENT OFFICE 2,648,408

RAILROAD BRAKE SLACK ADJUSTER

William O. Martin, Fort Smith, Ark.

Application December 30, 1949, Serial No. 135,898

4 Claims. (Cl. 188—200)

My invention relates more particularly to automatically operated slack adjuster mechanism for the brakes of locomotive tenders and for the brakes of railroad freight cars, for pneumatically taking up undue play or slack in the brake applying mechanism, or for adjusting said mechanism independently on each car, in order that the same brake force or desired braking pressure may be provided on the wheels of the different cars and substantially equal piston travel of the respective brake cylinders obtained; my invention also involves means for preventing undesirable take-up of slack in the brake rigging when the brakes are released.

In practice, with the respective brake cylinders receiving substantially the same amount of compressed air, it is apparent that a lesser brake applying pressure is obtained by a longer traveling piston (caused, for example, by worn brake shoes) than is the case with a piston requiring a shorter travel to effect proper brake application, with the result that unequal braking force would be applied to cars having unequal piston travel, which frequently results in serious conditions.

My improved slack adjuster, more specifically stated, contemplates telescopically arranged tie members between the live brake lever and the dead or floating brake lever which are arranged, through operation of the cylinder piston push rod, to move into greater telescopic relation during slack take-up operation.

My invention contemplates slack adjuster mechanism which automatically comes into action when the brake cylinder push-rod travels beyond its predetermined normal travel resulting from brake shoe wear or play in the brake mechanism; the slack take-up mechanism involving a pneumatically operated cylinder and piston controlled by air from the brake cylinder when the piston of the latter travels beyond a predetermined distance. The invention also contemplates what may be termed as a safety latch for preventing undesirable take-up when the brakes are in released condition and air is absent from the air cylinder of the brake mechanism of a particular car, in order that further movement of the take-up mechanism will be prevented.

The objects and advantages of my invention will be readily comprehended from the following detailed description of the accompanying drawings wherein—

Figure 1 is a top plan view of my improved slack adjuster as applied to a locomotive tender and/or to the various types of railroad freight cars at present in use; a portion of the usual air brake cylinder being broken away and in section and also showing portions of the car underframe.

Figure 2 is an enlarged sectional view taken on the line 2—2 of Figure 1, as viewed by the arrows and the mechanism shown in slack take-up position.

Figure 3 is a cross-section taken on the line 3—3 of Figure 1, with portions broken away.

In the exemplification, the live brake lever is shown at 10 connected at one end with the brake cylinder push rod 11 actuated by the admission of compressed air into the air brake cylinder 12 from the usual air line and the inlet pipe 12a; while the dead or floating lever 13 is pivotally mounted at one end at a fixed non-movable pivot point 14. The intermediate portion of lever 13 has a rod or rack bar 15, of a composite tie element, pivotally connected thereto. The tie element consists of the tie rod or rack bar 15 which telescopes into an inverted open ended member or housing 16 with side walls and open bottom. The housing 16, which is of somewhat inverted U-shape in cross-section, has a bifurcated end 17, which is pivotally connected at 18 to the live lever 10. Integral with the housing member 16, or rigidly secured in place, is an auxiliary or comparatively small air cylinder 19 having a spring controlled piston 20 whose piston rod 21 is provided with a laterally disposed extension or clevis-like bracket 22 on which an operating pawl 23 is pivotally mounted at 24. The pawl 23 is mounted in unbalanced or counter-weighted condition in order that its upper toothed end may remain in constant contact with the teeth of the rack bar 15.

The side walls of the tie member or housing 16 are provided with longitudinally extending slots as at 25 so as to permit relative longitudinal movement between the housing member 16 and the pawl carrying pivot pin 24 which rides in the slots 25. The opposite or rear end of the housing member 16 has a pawl or detent 26 pivotally mounted therein and also in an unbalanced or counter-weighted condition to constantly maintain the toothed end of the detent in constant engagement with the rack bar 15. The forward faces of the rack bar teeth are made sloping rearwardly as clearly shown in Figure 2, so as to permit the toothed end of detent 26 to ride over the rack bar teeth when the rack bar 15 is advanced or moved into housing 16 during slack take-up operation.

The elements thus far described, including the brake air cylinder 12 (with the exception of the brake lever tie means), are suitably mounted on the car under-frame or sills 27.

The auxiliary cylinder 19 is provided with an air inlet tube or flexible hose 28 whose opposite end is provided with a coupling at 29 for effecting communication with the metal tube 30, which in turn, is connected to and communicates with a port 31 shown in the side wall of the brake air cylinder 12 (see Figure 1). The tube or hose 28 in Figure 3 is partly broken away in order to disclose the metal tubing 30 which connects with the brake air cylinder 12.

The cylinder 12 is shown provided with an arcuate, spring controlled piston 32 which reciprocates normally between the port 31 and the pressure head 33. Therefore, port 31 will not be uncovered during normal piston travel when there is no undesirable play or slack in the brake rigging, and hence the operating medium or compressed air will not flow through the tubes 30—28 to the auxiliary cylinder 19 and no operation of piston 20 will occur.

The piston 32 in the brake air cylinder 12, as shown in Figure 1, indicates that there is undue slack in the brake rigging which necessitated the undue travel of piston 32, uncovered the port 31 and caused actuation of the slack take-up piston 20, as shown in Figure 2. When flow of compressed air to brake cylinder 12 is discontinued, namely when the brakes are released, the air in the pressure end of the cylinder 19 will return to the non-pressure end 12b of the brake cylinder 12 (piston 32 having returned to normal inoperative position) and escape to atmosphere. Air pressure on piston 20 having been reduced, spring 35 will return piston 20 to normal position at the air inlet end of cylinder 19, causing piston rod 21 and actuating pawl 23 to force the rack bar 15 farther into housing 16, namely to the right in Figure 2, thereby shortening the tie element between the brake levers 10 and 13 and requiring a shorter stroke of brake cylinder piston 32 to effect proper brake operation; too far telescopic movement of rack bar 15 into housing 16, or any undesirable movement of the take-up mechanism is prevented by the safety latch hereinafter described.

The piston rod 21 of piston 20 and within cylinder 19 is provided with a spacer or sleeve 34 of predetermined length to prevent seating of the spring 35 and consequently determine the degree of travel of piston 20.

In the event of undue play or slack in brake rigging—caused, for example, by brake shoe wear, the brake applying piston 32 will travel beyond its normal zone thereby uncovering port 31 and allowing air to enter into tubes 30—28 and causing piston 20 in auxiliary cylinder 19 to reciprocate or travel to the position shown in Figure 2, which, in turn, will through the piston rod 21, move bracket 22 with the pivot 24 of pawl 23 to the left (Figure 2) thereby causing the toothed end of pawl 23 to ride over the adjacent teeth and to engage with a succeeding tooth and/or teeth of the rack bar 15. Upon return of piston 20 to normal position through the action of its spring 35, the pawl 23 is drawn to the right (Figure 2) which in turn, causes the rack bar 15 to farther telescope into the housing 16 thereby shortening the composite tie means between the levers 10 and 13. The advanced position of the rack bar 15 into the housing 16 will be maintained by the detent 26 which prevents movement of the rack bar to the left in Figure 2.

The housing 16, adjacent its left-hand end, is provided with a bracket 36 for pivotally or tiltably mounting the transversely extending release lever 37 (extending to opposite sides of the car) which is provided with laterally extending arms 38, 39, whose ends are arranged to engage beneath and tilt the actuating pawl 23 and the detent 26, respectively, out of holding engagement with the teeth of the rack bar 15 and thus permit the live or cylinder lever 10 and the floating lever 13 to move back to normal spaced position when it is necessary to make brake shoe replacement.

In order to prevent undesired movement between rack bar 15 and housing 16, while the pawl 23 and detent 26 are held in inoperative position, I provide piston rod 21 with the safety latch or spring plates 40 whose free ends frictionally engage the rack bar 15—see Figure 2; the spring plates 40, however, in no way retarding or interfering with the normal operational movement of the housing 16 and rack bar 15. The piston rod 21, intermediate its ends—namely at a point coincident with the cylinder 19 holding wall portion of the housing 16, when no air is in cylinder 19 and piston 20 is at rest—is provided, in the specific exemplification shown, with overlapping spring plates shown at 40, with the upper free end of the outer plate in engagement with the teeth of the rack bar 15, see Figure 2. The plates 40 force and hold the rack bar 15 upwardly (especially when the outer plate is riding on the inclined faces of the rack-bar teeth) against the top closed wall of the housing 16, where the spring plates 40 are disposed against the depending wall of the housing 16, which is their normal position while the take-up mechanism is at rest with no air in cylinder 19 and its piston is at the right-hand end of cylinder 19—Figure 2 showing the mechanism during a take-up operation and the safety latch plates unsupported at the forward side by the supporting wall of housing 16. In the position of the mechanism as shown, the upper spring plate 40 will flex and ride over the teeth of the rack-bar 15 through the action of piston spring 35, and become positioned against the depending housing wall where the spring plates will be "backed up" against yield or flexing and the rack-bar 15 held against the top wall of the housing 16 and undesired short piston travel prevented, so that a false take-up is made impossible. The position or location of the safety latch is obtained when cylinder 19 is free of air and the piston 20 is at the right-hand end of the cylinder; the safety latch 40 being immovably secured to the piston rod 21 immediately against the cylinder holding depending portion of the housing 16.

The spacer 34 is of predetermined length to control the number of teeth to be engaged by operating pawl 23 during a slack take-up operation.

With the rack and pawl arranged within the housing of the tie means these elements are more or less protected and corrosion of the movable elements is prevented.

I have shown and described what I believe to be the simplest and best exemplification of my improved brake slack adjuster, automatically operative during brake applying operation, but structural modifications are possible and may be made, however, without departing from the spirit of my invention as defined in the appended claims.

What I claim is:

1. In a brake slack adjuster the combination of the live lever, the floating lever of a railroad car brake rigging and the brake air cylinder whose push rod is pivotally connected with the live lever; with a telescopic tie connection between said levers comprising an elongated open ended and open bottom housing pivotally connected at one end to the live lever and a rack bar slidable in said housing and pivotally connected at its outer end to said floating lever; means pivotally mounted against longitudinal travel and in yielding operative relation with said rack bar for preventing outward sliding movement of the rack bar; an auxiliary cylinder with a spring controlled piston whose rod at the outer end is provided with a pivotally mounted pawl which extends upwardly through the housing bottom and is arranged in mesh with the rack bar of said tie connection; a safety latch secured to said piston rod and operatively associated with said rack-bar and adapted to arrest false take-up movement of the rack-bar; and an air conveying connection between one end of said auxiliary cylinder and a port in said air cylinder side wall, said port being arranged beyond the normal travel of the cylinder piston, whereby air will be admitted to said auxiliary cylinder when the brake cylinder piston travels past said port, thereby actuating the auxiliary piston with said safety latch, causing said pawl and safety latch to engage a succeeding tooth and/or teeth of the rack bar and inducing prescribed inward movement of said rack bar upon non-inflow of compressed air into the auxiliary cylinder and the pressure action of the spring in the auxiliary cylinder resulting upon return of the brake cylinder piston to brake releasing position.

2. In a brake slack adjuster, the combination of the live and floating levers of a railroad car brake rigging and the brake air cylinder whose piston is operatively connected with the live lever; regulable tie means between the two levers consisting of an open ended and bottom elongated housing pivotally connected at one end to said live lever and a rack bar slidably mounted in the housing with its outer end pivotally connected with said floating lever; an auxiliary air cylinder immovably mounted beneath said rack-bar provided with a spring controlled piston; an operating pawl carried by the outer end of the piston rod of said last mentioned piston, with its toothed end in mesh with said rack bar and adapted to effect holding engagement with succeeding teeth of the rack bar when said auxiliary cylinder piston rod moves outwardly; means operatively intermediate the auxiliary piston and the rear or non-pressure end wall of the auxiliary cylinder whereby the degree of outward movement of said piston rod is controlled and the extent of rack bar movement determined; safety means carried by said last mentioned piston rod and having operative relation with said rack-bar, whereby false take-up movement of said rack-bar is prevented; a compressed air connection between said main brake cylinder and said auxiliary cylinder, for actuating the piston of the latter, arranged to be in non-conveying condition during normal travel of the main cylinder piston and air conveying condition to be established when the main cylinder piston travels beyond a predetermined extent.

3. In a brake slack adjuster for the air brakes of a railroad car involving the live and the floating levers of the brake rigging and the brake air cylinder whose piston is operatively connected with the live lever, the side wall of the cylinder removed from the pressure end beyond the normal brake-applying position of its piston, having an outlet port regulable tie means between the live lever and the dead lever comprising an elongated open ended housing pivotally connected at one end to the live lever; a rack bar with downwardly presented teeth slidably mounted in said housing and pivotally connected at its outer end to the dead lever; a detent carried by said housing for holding the rack bar against outward sliding movement; an auxiliary air cylinder arranged to be in air receiving communication with said port of the brake cylinder when the piston of the latter travels beyond said port and establishes communication with the pressure end of the brake cylinder; a spring controlled piston in said auxiliary cylinder having a piston rod disposed substantially parallel with the tie means and provided with a pivoted operating pawl arranged in mesh with the teeth of the rack bar; safety means operatively intermediate said piston-rod and said rack-bar for preventing false take-up movement of the rack-bar when the brakes are released; and means operatively associated with the auxiliary piston rod for controlling the extent of outward movement of the auxiliary piston rod.

4. In a brake slack adjuster for the air brakes on a railroad car involving the live lever and the floating lever of the brake mechanism and the brake air cylinder whose piston is operatively connected with the live lever; regulable tie means between the live lever and the dead lever comprising an elongated open ended housing pivotally connected at one end to the live lever; a rack bar with downwardly presented teeth slidably mounted in said housing and pivotally connected at its outer end to the dead lever; a detent pivotally mounted in said housing for holding the rack bar against outward sliding movement; an auxiliary air cylinder arranged to be in air receiving communication with the brake cylinder when the piston of the latter travels beyond a predetermined point, said auxiliary cylinder having a spring controlled piston whose rod extends substantially parallel and in spaced relation with the tie means and provided at its outer end with a pivoted operating pawl arranged in mesh with the teeth of said rack bar and whereby the rack-bar is moved inwardly; means arranged on the piston rod of said auxiliary cylinder for controlling the extent of outward movement of said auxiliary piston rod; and a spring latch secured to the auxiliary cylinder piston and extending into controlling relation with the rack-bar for arresting said rack-bar against false take-up movement when the brakes are released and the auxiliary cylinder contains no air; in combination with a hand operated lever disposed transversely of the car and beneath the depending ends of said detent and said operating pawl whereby the detent and the pawl will be moved out of the rack bar engagement.

WILLIAM O. MARTIN.

References Cited in the file of this patent

UNITED STATES PATENTS

| Number | Name | Date |
|---|---|---|
| 1,772,433 | Anderson | Aug. 5, 1930 |
| 1,798,436 | Sauvage | Mar. 31, 1931 |
| 1,845,070 | Anderson | Feb. 16, 1932 |